Jan. 6, 1925.

H. L. RIDENOUR

CONTROL FOR PIPES OF TANKS

Filed Aug. 12, 1924   2 Sheets-Sheet 1

1,522,327

Inventor,
Herbert L. Ridenour
By _____
Attorney

Jan. 6, 1925.
H. L. RIDENOUR
CONTROL FOR PIPES OF TANKS
Filed Aug. 12, 1924
1,522,327
2 Sheets-Sheet 2
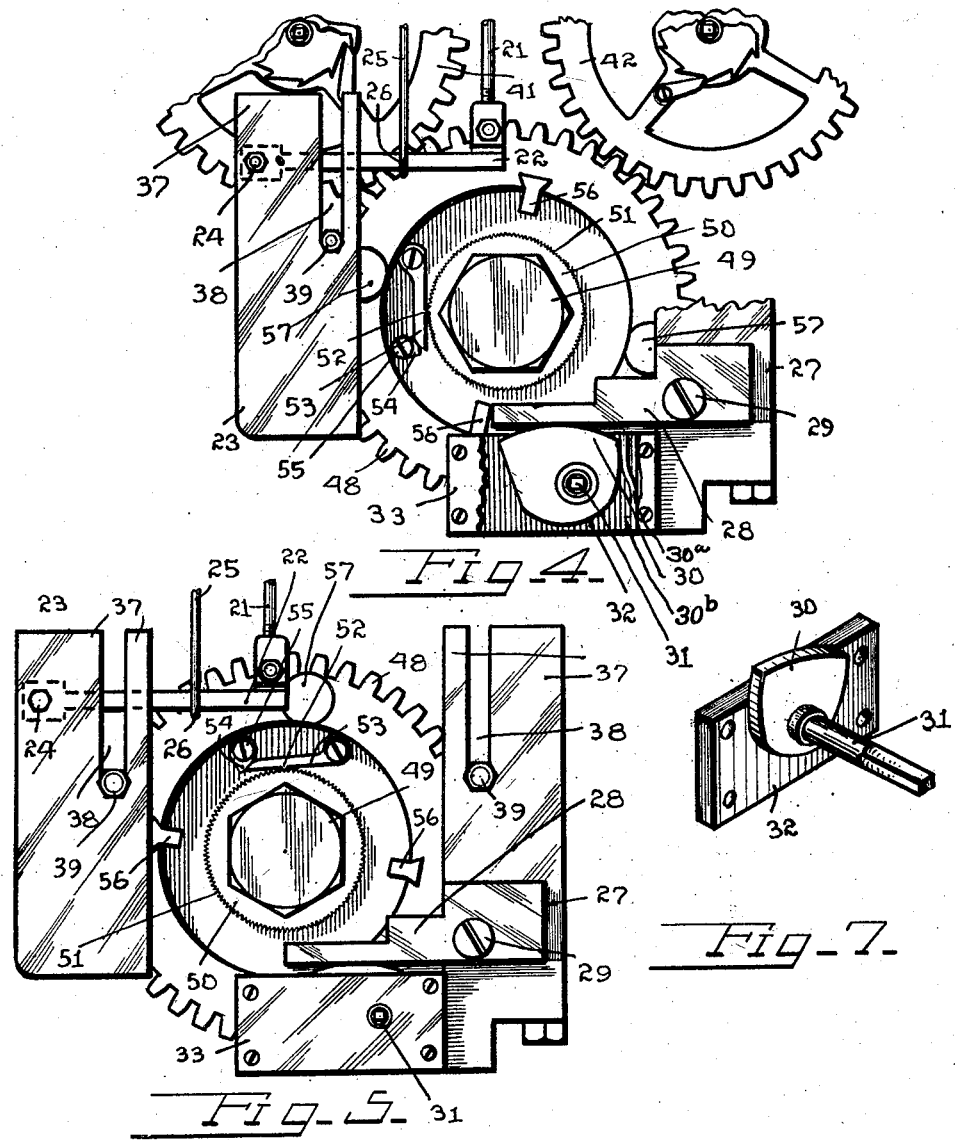
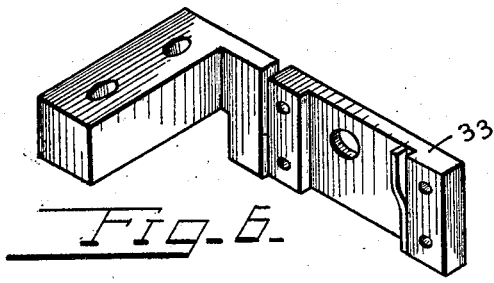
Inventor,
Herbert L. Ridenour,
By
Attorney Patented Jan. 6, 1925.

1,522,327

UNITED STATES PATENT OFFICE.

HERBERT L. RIDENOUR, OF HICKSVILLE, OHIO.

CONTROL FOR PIPES OF TANKS.

Application filed August 12, 1924. Serial No. 731,622.

*To all whom it may concern:*

Be it known that I, HERBERT L. RIDENOUR, a citizen of the United States of America, and resident of Hicksville, in the county of Defiance and State of Ohio, have invented certain new and useful Improvements in Controls for Pipes of Tanks, of which the following is a specification.

This invention relates to controls for the discharge pipes of oil tanks, and has for an object the provision of novel means whereby a valve of a discharge pipe of an oil tank may be operated for opening and closing the said valve, and in which mechanism for closing the valve is automatically actuated when oil in the tank has receded to a predetermined level. When oil is to be discharged from a tank to a pipe line, the gager or representative of the purchasing company determines the contents of the tank to be emptied and then discharges the oil from the tank to the pipe line.

It is an object of this invention to produce novel means whereby the company's representative, to be hereinafter referred to as the "gager" may, after he has determined the contents of the tank, open the valve of the tank discharge pipe to permit the oil to escape from the tank to the pipe line; and it is an object of this invention to provide novel means whereby the valve will be opened in the presence of the gager and to provide means to guard against the closing of the valve until the oil has been discharged from the tank and it has reached a predetermined level therein; the said invention furthermore contemplating the provision of novel means for automatically closing the valve before the oil has receded to the mouth of the discharge pipe, since such recession beyond a predetermined degree would permit air to enter into the discharge pipe and the pipe line, interfering with the pumping apparatus of the pipe line.

It is a further object of this invention to provide a valve associated with a motor that is effective to rotate the valve in order that the port of a valve plug may register with the discharge port of the valve, or that the valve be turned to carry the port of the plug out of alinement or registry with the port of the valve.

It is a still further object of this invention to produce a manually operated trip to be actuated by the gager for opening the valve, and a mechanically actuated trip operated by a float within the tank for releasing the valve operating mechanism for closing the valve.

It is a still further object of this invention to produce controlling mechanism of the character indicated which may be installed on tank discharge pipes now in common use, and which may be mounted in association with oil tanks of conventional types now commonly employed.

It is a still further object of this invention to produce a valve controlling mechanism that may be housed in order that it may not be tampered with by unauthorized persons.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 4 illustrates an enlarged detail view of part of the motor and valve;

Figure 5 illustrates a view similar to Fig. 4 with parts in different positions of adjustment;

Figure 6 illustrates a perspective view of fragments of the frame; and

Figure 7 illustrates a perspective view of the operating means.

Figure 1:
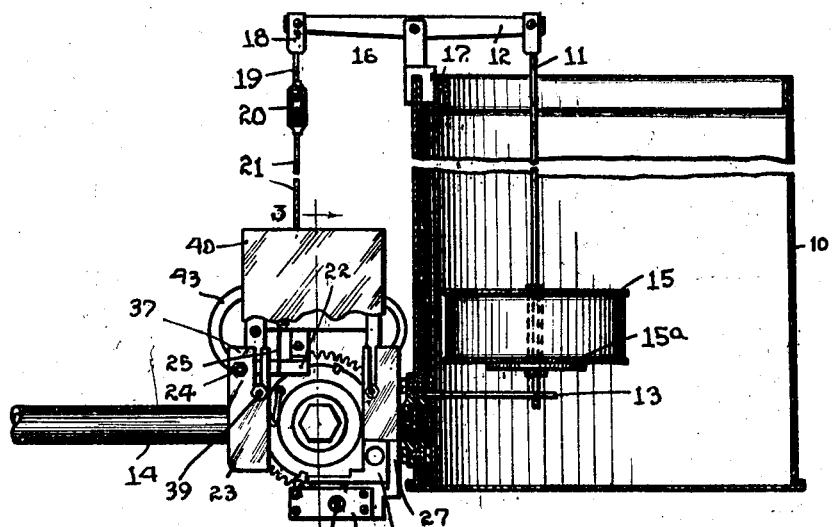
Figure 1 illustrates a sectional view of a storage tank with its discharge pipe in elevation, showing a device embodying the invention applied thereto.

In these drawings, 10 denotes a storage tank which may be of any capacity desired and within the said tank a guide 11 is suspended from a lever 12. Preferably the lower end of the guide is secured by a bracket 13 extending from the wall of the tank above the outlet pipe 14. The bracket prevents oscillation of the float guide and insures proper movement of the float 15 vertically of the tank. The guide 11 has a stationary shoulder or stop 15$^a$ on which the float settles in its descent and further gravitation of the float will result in moving the guide rod vertically.

The lever 12 is oscillatable on a bracket 16 that may be secured on the upper edge of the tank by a fastening 17 such as a set screw or the like, and the said lever has a coupling 18 attached to its outer end. A rod 19 extends downwardly from the coupling and it is engaged by a turnbuckle 20, that is adjustable on the said rod, the said turnbuckle in turn being adjustably connected to the rod 21 that has its lower end supporting a latch or detent 22 pivotally mounted on a supporting frame member 23, by means of a pivot 24. A hanger or guard 25 is supported from a portion of the frame and it has an angularly disposed end 26 that extends under the detent 22 and limits the downward movement of the detent.

Another supporting frame member 27 has a latch or detent 28 oscillatably connected to it by the pivot 29, and this last mentioned detent alternates with the latch or detent 22 in arresting the valve operating mechanism, as will presently appear. The latch 28 is manually operated to release the valve, and in the present embodiment of the invention, the manually operated release comprises an eccentric plate 30 that is secured on a key-shaft 31, the said key-shaft being journaled in the plate 32 and the face plate 33 thereof.

When a gager desires to operate the motor to open the valve, the key shaft 31 may be rotated to cause the cam 30 to lift the latch 28. The gager could than return the latch operating cam to normal position in order that the latch may assume normal position to arrest the valve after the cycle of operation has been completed. However, to insure a more positive operation of the cam regardless of the action of the gager, a spring 30ᵃ may be provided which bears against the side of the cam above the axis of the shaft 31 with sufficient force to positively return the shaft to normal position after the key or operating means for the shaft 31 is released by the gager.

The spring in the present embodiment of the invention is anchored to the plate 33 by a suitable set screw 30ᵇ.

The supporting frames 23 and 27 are of practically identical construction, except as to attachments which they carry or support, and a description of one of them will, it is thought, suffice for an understanding of their construction. The supporting frame 23 is shown in end elevation (Fig. 2), and it will be seen that it comprises a body portion 34 having an aperture 35, through which the pipe 14 extends. Each supporting frame is therefore mounted on the discharge pipe and each may be secured to the discharge pipe by a fastening 36 such as a set screw. The supporting frame includes the upstanding portions 37, and each upstanding portion has a slot 38 to receive studs such as 39 that project from the sides of the motor frame 40.

Figure 2:
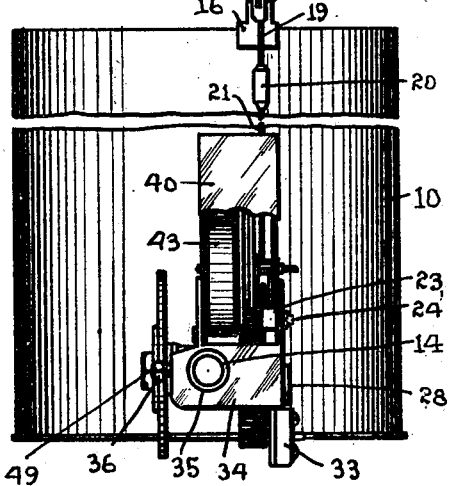
Figure 2 illustrates a view in elevation with a device shown at right angles to the position in which it is shown in Fig. 1.
Figure 3:
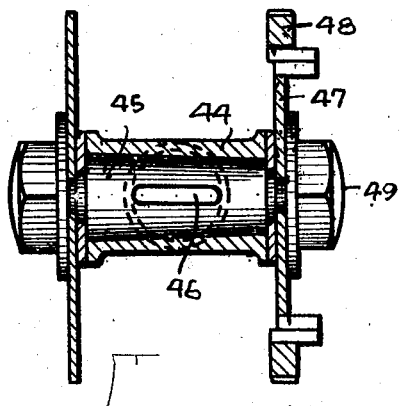
Figure 3 illustrates a sectional view of the valve and parts associated with it.

The motor frame constitutes a support for the motor and its operating parts, and preferably a spring motor may be employed, although the inventor does not wish to be limited in this regard. However, in the present embodiment of the invention as illustrated, toothed wheels 41 and 42 are employed and they may be driven by a train or gearing from springs, as in clockworks. One of the springs 43 of the motor is shown in Fig. 2, but it is believed unnecessary to show or describe the motor parts, since numerous expedients may be employed for communicating power to the gear wheels 41 and 42. It is the purpose of the inventor that the power of the motor shall be maintained on the said wheels 41 and 42 at all times, and that the arresting and releasing mechanisms shall be relied upon to retard or to permit actuation of the valve, as will presently appear. In fact, it is the purpose of the inventor not to be restricted to the employment of two such wheels as 41 and 42, since if the motor is sufficiently powerful and the parts are so proportioned, the valve could be actuated by a single toothed wheel.

The valve of the present embodiment is of the plug valve type, in which the casing 44 is interposed between sections of the discharge pipe 14 with ports communicating with the pipe sections. A plug 45 is rotatable in the valve plug and it has a port 46 extending therethrough in order that the valve plug may be turned to cause the port 46 to register with the discharge pipe, or sealed by the wall of the casing, as will be understood by those skilled in the art.

The valve plug extends beyond the casing and a disk 47 is secured on it, the said disk having a peripheral gear 48 meshing with the gear wheels 41 and 42, and it is the purpose of the inventor that these gear wheels shall communicate motion to the disk and turn the valve plug.

In order that the valve plug may be held in the valve casing with sufficient pressure to prevent the development of a leak between the valve plug and its casing, a shank of the valve plug has the cap-nut 49 threaded on it, the said cap-nut being effective to draw the valve plug into close engagement with the wall of its casing. In order that the adjustment may be maintained, the cap-nut has a flange 50 with peripheral serrations 51 to be engaged by the tooth 52 of the dog 53, a condition which insures the retention of the cap-nut in its different positions of adjustment. To guard against displacement of the tooth of the dog from the serrations, a retaining block 54 is caused to bear against the end of the dog, and the said block may be held in place by a screw 55. By loosening the screw 55, the dog may be released while the cap-nut is being adjusted for the purpose heretofore stated.

The face of the disk 47 is provided with two sets of detent or latch engaging lugs or shoulders, one set being at a different radius than the other set. The lugs or shoulders 56 that are intended to be engaged by the latch or detent 28 project from the face of the disk and as the disk turns, the said shoulders will be engaged by the end of the latch or detent 28 when in its normal position. When the dog is lifted by the manipulation of the cam 30, the end of the latch 28 is lifted clear of the lug 56 and the disk is freed to be driven by the motor, and the relations of parts is such that the valve plug is rotated a quarter of a revolution to cause its port to register with the axis of the discharge pipe.

The lugs or projections 57 which extend from the face of the disk are located between the lugs 56, but are further from the center than the lugs 56. They are so positioned that they will pass the end of the latch or detent 28, but will be engaged by the end of the latch or detent 22, whereas the lugs 56 will pass the end of the latch or detent 22, but will be engaged and arrested by the latch or detent 28.

From an inspection of the drawing and from the foregoing description, it will be apparent that if a gager operates the latch 28 to free the lug 56 and the weight of the float 15 is relieved from the guide rod, as it will be when the tank has oil in it to be discharged, the motor will turn the valve plug to the open position of the valve and one of the lugs 57 will be arrested by reason of its engaging the latch 22. The gager having opened the valve, the oil will flow from the tank and this will continue until the float has descended on the guide and reached the shoulder thereon that arrests the float. As the oil recedes to a limited degree, the weight of the float will operate the lever 12 and the lever in turn will raise the latch or detent 28 from engagement with one of the lugs 57 and free the disk in order that it may be turned under the influence of the motor. The motion imparted to the disk will turn the valve plug to a closed position of the valve, and the next succeeding lug 56 will be engaged by the latch or detent 28, and the flow of oil from the tank will be interrupted. The parts will retain the positions just described until the gager again releases the latch or detent 28, except, of course, the float 15 will rise as oil is delivered to the tank.

While a form of the invention has been described as associated with the discharge pipe of an oil tank, it is to be understood that the valve operating mechanism may be associated with pipes for different uses and that it may be associated with tanks employed for different purposes, so that the inventor does not wish to be limited with respect to the application of the invention in practice.

I claim:

1. In a control for pipes of tanks, a supporting frame adapted for attachment to a discharge pipe of an oil tank associated with a valve for such pipe, a motor supported by the frame, means for communicating the motion of the motor to the valve for opening and closing the valve, a mechanically operated and a manually operated valve arresting means operative alternately, and a float in the tank the gravity of which communicates motion to the mechanically operated valve arresting means for releasing the valve when oil has reached a predetermined level in the tank.

2. In a control for pipes of tanks, an oil tank, a lever oscillatably supported on the tank, a guide depending from the lever into the tank, a float slidable on the said guide, a member carried by the guide on which the float rests when unsupported by the contents of the tank, a discharge pipe for the tank, a valve therein, a motor for opening and closing the valve, a latch pivotally mounted with respect to a part of the apparatus operated by the motor for engaging a movable part and arresting the motor, a connection from the lever to the said latch, a manually operated latch for engaging the part of the apparatus moved by the motor for arresting the same and operative alternately with the first mentioned latch for intermittently releasing and arresting the valve when opening and closing.

3. In a control for pipes of tanks, a tank having a discharge pipe, a lever oscillatably mounted on the tank, a guide depending from the lever into the tank, a float mounted to slide on the guide, means for communicating the motion of the float to the guide when the float is unsupported by fluid in the tank, a motor having a frame, means on the discharge pipe for supporting the motor, a plug valve in the discharge pipe, means connecting the motor to the plug of the valve for rotating the same, mechanical means operated by the lever for arresting and releasing the rotary motion of the plug, and manually operated means for arresting and releasing the plug alternately with the operation of the manually operated plug controlling device.

4. In a control for pipes of tanks, a tank having a discharge pipe, a supporting bracket on the said pipe having slots forming seats, a motor frame having projections thereon resting in the said slots whereby the motor frame is supported above the pipe, gear wheels mounted in the frame and adapted to be motor driven, a valve casing interposed in the discharge pipe, a plug valve therein having an end projecting beyond the valve casing, a disk secured on the extension of the plug, the said disk having a toothed periphery engaged by the motor driven gear wheels, pairs of lugs on the face of the disk, one pair being stepped with relation to the other pair of lugs, a manually operated latch adapted to engage and release alternately the lugs of one pair, a mechanically actuated latch adapted to engage and release alternately the lugs of the other pair, and means controlled by the level of fluid in the tank for communicating motion to the manually operated latch.

5. In a control for pipes of tanks, a tank having a discharge pipe, a supporting bracket on the said pipe having slots forming seats, a motor frame having projections thereon resting in the said slots whereby the motor frame is supported above the pipe, gear wheels mounted in the frame and adapted to be motor driven, a valve casing interposed in the discharge pipe, a plug valve therein having an end projecting beyond the valve casing, a disk secured on the extension of the plug, the said disk having a toothed periphery engaged by the motor driven gear wheels, pairs of lugs on the face of the disk, one pair being stepped with relation to the other pair of lugs, a manually operated latch adapted to engage and release alternately the lugs of one pair, a mechanically actuated latch adapted to engage and release alternately the lugs of the other pair, a lever oscillatably mounted on the tank, means for communicating the motion of the mechanically operated latch, and a float in the tank connected to the lever for imparting motion to the lever when fluid in the tank has reached a predetermined level.

6. In a control for pipes of tanks, a tank having a discharge pipe, a supporting bracket on said pipe having slots forming seats, a motor frame having projections thereon resting in the said slots whereby the motor frame is supported above the pipe, gear wheels mounted in the frame and adapted to be motor driven, a valve casing interposed in the discharge pipe, a plug valve therein having an end projecting beyond the valve casing, a nut threaded on the end of the projecting portion of the plug bearing against the disk for regulating the pressure of the valve plug against the wall of the valve casing, and a nutlock for holding the nut at different positions of adjustment, a disk secured on the extension of the plug, the said disk having a toothed periphery engaged by the motor driven gear wheels, pairs of lugs on the face of the disk, one pair being stepped with relation to the other pair of lugs, a manually operated latch adapted to engage and release alternately the lugs of one pair, a mechanically actuated latch adapted to engage and release alternately the lugs of the other pair, a lever oscillatably mounted on the tank, means for communicating the motion of the mechanically operated latch, and a float in the tank connected to the lever for imparting motion to the lever when fluid in the tank has reached a predetermined level.

HERBERT L. RIDENOUR.